US008877069B2

(12) United States Patent
Valdez et al.

(10) Patent No.: US 8,877,069 B2
(45) Date of Patent: Nov. 4, 2014

(54) TETHERED CATALYSTS FOR THE HYDRATION OF CARBON DIOXIDE

(75) Inventors: Carlos A. Valdez, San Ramon, CA (US); Joe H. Satcher, Jr., Patterson, CA (US); Roger D. Aines, Livermore, CA (US); Sergio E. Wong, Livermore, CA (US); Sarah E. Baker, Dublin, CA (US); Felice C. Lightstone, Fremont, CA (US); Joshuah K. Stolaroff, Oakland, CA (US)

(73) Assignee: Lawrence Livermore National Security, LLC., Livermore, CA (US)

( * ) Notice: Subject to any disclaimer, the term of this patent is extended or adjusted under 35 U.S.C. 154(b) by 461 days.

(21) Appl. No.: 13/369,088

(22) Filed: Feb. 8, 2012

(65) Prior Publication Data
US 2012/0199535 A1    Aug. 9, 2012

Related U.S. Application Data

(60) Provisional application No. 61/440,507, filed on Feb. 8, 2011.

(51) Int. Cl.
| | | |
|---|---|---|
| C02F 1/20 | (2006.01) | |
| B01J 31/18 | (2006.01) | |
| B01D 19/00 | (2006.01) | |
| C02F 1/66 | (2006.01) | |
| B01D 53/86 | (2006.01) | |
| C02F 103/00 | (2006.01) | |

(52) U.S. Cl.
CPC .......... *B01D 19/0005* (2013.01); *B01J 31/182* (2013.01); *C02F 1/20* (2013.01); *Y02C 10/06* (2013.01); *B01J 2531/26* (2013.01); *B01D 2257/504* (2013.01); *B01J 2531/845* (2013.01); *B01J 2531/847* (2013.01); *C02F 1/66* (2013.01); *B01D 53/8671* (2013.01); *B01J 2531/0258* (2013.01); *B01J 2531/16* (2013.01); *Y02C 10/04* (2013.01); *C02F 2103/007* (2013.01)
USPC ...................... 210/750; 210/242.1; 210/500.1; 210/502.1; 502/343

(58) Field of Classification Search
CPC .............. C02F 1/20; C02F 1/288; C02F 1/40; B01D 19/005; B01D 53/00; B01D 53/8671; B01J 31/182; B01J 2531/0258; B01J 2531/16; B01J 2531/26; B01J 2531/845; B01J 2531/847
USPC ........... 210/632, 749, 750, 242.1, 500.1, 501, 210/502.1; 502/343
See application file for complete search history.

(56) References Cited

U.S. PATENT DOCUMENTS 3,766,013 A  *  10/1973  Forgione et al. ............... 435/182
5,197,464 A  *  3/1993  Babb et al. ................ 128/207.14
(Continued)

OTHER PUBLICATIONS

Walter, Katie, "Carbon Dioxide into the Briny Deep," Research Highlights, Lawrence Livermore National Laboratory, S&TR Dec. 2010, pp. 22-24.

(Continued)

*Primary Examiner* — Lucas Stelling
(74) *Attorney, Agent, or Firm* — Eddie E. Scott

(57) ABSTRACT

A system is provided that substantially increases the efficiency of $CO_2$ capture and removal by positioning a catalyst within an optimal distance from the air-liquid interface. The catalyst is positioned within the layer determined to be the highest concentration of carbon dioxide. A hydrophobic tether is attached to the catalyst and the hydrophobic tether modulates the position of the catalyst within the liquid layer containing the highest concentration of carbon dioxide.

6 Claims, 11 Drawing Sheets

(56) References Cited

U.S. PATENT DOCUMENTS

| | | | |
|---|---|---|---|
| 5,668,193 A * | 9/1997 | Gouda et al. | 523/112 |
| 5,876,488 A | 3/1999 | Birbara et al. | |
| 7,763,097 B2 * | 7/2010 | Federspiel et al. | 95/46 |
| 7,776,927 B2 | 8/2010 | Chu et al. | |
| 2007/0169625 A1 | 7/2007 | Aines et al. | |
| 2007/0170060 A1 | 7/2007 | Bourcier et al. | |
| 2009/0000476 A1 | 1/2009 | Saito et al. | |
| 2009/0012187 A1 | 1/2009 | Chu et al. | |
| 2009/0131543 A1 | 5/2009 | Weitz et al. | |
| 2009/0145297 A1 | 6/2009 | Ferguson et al. | |
| 2010/0300287 A1 | 12/2010 | Aines et al. | |
| 2010/0303694 A1 | 12/2010 | Aines et al. | |
| 2011/0151537 A1 | 6/2011 | Lightstone et al. | |

OTHER PUBLICATIONS

Figueroa, Jose D., "Advances in CO2 Capture Technology—The The U.S. Department of Energy's Carbon Sequestration Program". International Journal of Greenhouse Gas Control 2 (2008). 2007 Elsevier Ltd., pp. 9-20.

Belmabkhout, Youssef, "Adsorption of CO2-Containing Gas Mixtures over Amine-Bearing Pore-Expanded MCM-41 Silica: Application for Gas Purification." 2010 American Chemical Society. Published on Web Nov. 13, 2009, pp. 359-365.

Walter, Katie, "Robust Catalysts for Carbon Capture," Science & Technology Review, Lawrence Livermore National Laboratory, S&TR Mar. 2011, pp. 5-9.

* cited by examiner

BIOMIMETIC
SMALL MOLECULE

TETHERED CATALYSTS FOR THE HYDRATION OF CARBON DIOXIDE

CROSS-REFERENCE TO RELATED APPLICATIONS

This application claims benefit under 35 U.S.C. §119(e) of U.S. Provisional Patent Application No. 61/440,507, filed Feb. 8, 2011 entitled "tethered catalysts for the hydration of carbon dioxide." The disclosure of U.S. Provisional Patent Application No. 61/440,507, filed Feb. 8, 2011 is incorporated herein in its entirety for all purposes by this reference.

U.S. patent application Ser. No. 12/783,394 filed May 19, 2010 by Roger D. Aines, one of inventors in the present application, for Catalyst Functionalized Buffer Sorbent Pebbles for Rapid Separation of Carbon Dioxide from Gas Mixtures, published as United States Published Patent Application No. US 2010-0233094 A1, discloses systems related to the present invention. U.S. patent application Ser. No. 12/784,665 filed May 21, 2010 by Roger D. Aines, William L. Bourcier, and Brian Viani, Roger D. Aines being an inventor in the present application; for Slurried Solid Media for Simultaneous Water Purification and Carbon Dioxide Removal from Gas Mixtures, published as United States Published Patent Application No. US 2010-0300287 A1, discloses systems related to the present invention. U.S. patent application Ser. No. 13/312,418 filed Dec. 6, 2011 by Roger D. Aines, Christopher M. Spadaccini, Joshua K. Stolaroff and William L. Bourcier; Roger D. Aines and Joshua K. Stolaroff being inventors in the present application; for Separation of a Target Substance from a Fluid or Mixture using Encapsulated Sorbents, discloses systems related to the present invention. The disclosures of U.S. patent application Ser. No. 12/783,394 filed May 19, 2010 and published as United States Published Patent Application No. US 2010-0303694 A1; U.S. patent application Ser. No. 12/784,665 filed May 21, 2010 and published as United States Published Patent Application No US 2010-0300287 A1; and U.S. patent application Ser. No. 13/312,418 filed Dec. 6, 2011 are incorporated herein in their entirety for all purposes by this reference.

STATEMENT AS TO RIGHTS TO INVENTIONS MADE UNDER FEDERALLY SPONSORED RESEARCH AND DEVELOPMENT

The United States Government has rights in this invention pursuant to Contract No. DE-AC52-07NA27344 between the United States Department of Energy and Lawrence Livermore National Security, LLC for the operation of Lawrence Livermore National Laboratory.

BACKGROUND

1. Field of Endeavor

The present invention relates to the removal of carbon dioxide from a fluid through the use of tethered catalysts, which optimize the catalyst location for more efficient carbon dioxide removal.

2. State of Technology

The article "Carbon Dioxide into the Briny Deep" in the December 2010 issue of Science and Technology Review provides the state of technology information quoted below and is incorporated herein in its entirety for all purposes.

"WITH every passing year, the amount of carbon dioxide ($CO_2$) in the atmosphere increases. Because of the way this gas absorbs and emits infrared radiation, excessive quantities can cause the warming of Earth's atmosphere. Natural sources of atmospheric $CO_2$ such as volcanic outgassing, the combustion of organic matter, and the respiration processes of living aerobic organisms are nearly balanced by physical and biological processes that remove the gas from the atmosphere. For example, some $CO_2$ dissolves in seawater, and plants remove some by photosynthesis."

"However, problems arise with the increased amounts of $CO_2$ from human activities, such as burning fossil fuels for heating, power generation, and transport as well as some industrial processes. Natural processes are too slow to remove these anthropogenic amounts from the atmosphere. In 2008, 8.67 gigatons of carbon (31.8 gigatons of $CO_2$) were released worldwide from burning fossil fuels, compared with 6.14 gigatons in 1990. The present level of atmospheric CO, is higher than at any time during the last 800,000 years and likely is higher than it has been in the last 20 million years. Researchers around the world are exploring ways to dispose of this excess. One proposed approach, called carbon capture and sequestration, is to store $CO_2$ by injecting it deep into the ocean or into rock formations far underground. The G8, an informal group of economic powers including the U.S., has endorsed efforts to demonstrate carbon capture and sequestration. The international forum recommended that work begin on at least 20 industrial-scale $CO_2$ sequestration projects, with the goal of broadly deploying the technology by 2020."

"Several carbon sequestration projects are already under way. One, under the North Sea, is part of an oil drilling operation that separates $CO_2$ from natural gas and traps it in undersea rock formations. Other projects are using sequestered $CO_2$ to push oil around underground so that drillers can maximize the quantity of crude oil they remove a process called enhanced oil recovery."

"An alternative approach, being pursued by researchers at Lawrence Livermore and the Department of Energy's National Energy Technology Laboratory, involves putting $CO_2$ back into the ground while simultaneously producing freshwater. According to Livermore geochemist Roger Aines, who leads the Laboratory's work on this project, vast underground sandstone formations are filled with very salty water, many times saltier than the ocean. The idea is to pump $CO_2$ into these rock formations, thereby pushing briny water up into a reverse-osmosis water-treatment plant where most of the salt can be removed. The result is to increase volume for storing $CO_2$ in the underground formation while producing freshwater aboveground."

"Although this water might be too salty to drink, it would provide a critical resource for industrial processes that require huge quantities of freshwater. Petroleum refining, for example, consumes 1 to 2 billion gallons of water per day. Even technologies designed to reduce greenhouse gases, such as the biofuels production process, are increasing demands on the world's water resources."

The article "From Respiration to Carbon Capture," by Katie Walter of the Lawrence Livermore National Laboratory, in the March 2011 issue of *Science & Technology Review*, pages 4-9, provides the state of technology information quoted below and the disclosure of this article is incorporated herein in its entirety for all purposes.

"Our lungs separate, capture, and transport carbon dioxide ($CO_2$) out of blood and other tissues as part of the normal respiration process. The catalyst that initiates this natural response in the lungs is carbonic anhydrase, the fastest operating natural enzyme known."

"Other enzymes play an "energy" role in our bodies as well. For example, ribulose-1,5-bisphosphate carboxylase oxygenase, more commonly known as RuBisCO, catalyzes the first major step of carbon fixation. In that process, molecules of atmospheric $CO_2$ are made available to organisms in the form of energy-rich molecules such as glucose. Methane monooxygenase, or MMO, oxidizes the carbon-hydrogen bond in methane."

"Medical researchers have used these enzymes as guides for designing synthetic catalysts that speed up chemical reactions. Now, a collaboration led by Lawrence Livermore is examining carbonic anhydrase as the basis for a new molecule that does for coal-fired power plants what the enzyme does for our bodies: quickly separate $CO_2$. But instead of transporting it out of blood or tissue, the catalyst will remove the greenhouse gas before a power plant emits it to the atmosphere."

"Developing a synthetic molecule to replace $CO_2$ scrubbing processes that use amines could greatly speed up carbon capture," says geochemist Roger Aines, the principal investigator for the catalyst project. "Current analysis indicates that efficient catalysts might increase the capture rate for $CO_2$ separation by as much as 1,000 times."

"The ARPA-E team is examining two possible molecular designs. One is a relatively simple dissolved catalyst system that could be applied immediately in industrial practice. This technology, known as regenerable solvent absorption technology, or RAST, is being developed largely by Babcock & Wilcox. The second, a Livermore design, is a "tethered" molecule that holds the catalyst at the air-liquid interface where the $CO_2$ transfer typically takes place. The tethered molecule looks much like mosquito larvae floating just below the surface of water. This approach promises very high efficiency, but using it in power plants may require changes in industrial practices."

"Several challenges remain to make the synthetic catalysts suitable for a commercial $CO_2$ capture process. First, the molecular scaffolding must be structurally stable to preserve the metal ion in the catalytic pocket under high temperatures and pressures."

"Addressing structural robustness and fast catalytic rates would normally be a slow, expensive process. Because of Livermore's computational and synthetic chemistry capabilities, the ARPA-E team can quickly evaluate hundreds of candidate compounds computationally, synthesize dozens, and test the most promising ones in the laboratory. Aines estimates that in just two years, the team will be ready to conduct long-term stability experiments on candidate molecules in large-scale testing facilities."

"In addition, catalysts for the tethered molecule design must remain within about 100 micrometers of the gas-water interface, where they are most effective. If the catalyst is distributed throughout the solvent, more of it must be produced overall. The team is investigating an approach that adds a hydrophobic molecule to tether the molecule at the gas-water interface. Livermore's preliminary calculations show that such tethers do not deform the catalyst and should preserve full functionality. Another design possibility uses very small particles containing the catalyst on their surface. These particles move with the solvent and can be easily extracted before thermal desorption."

"As candidate molecules move closer to commercialization, team members at Livermore and Babcock & Wilcox will work together to balance the cost of catalyst production with the molecule's expected lifetime. "For now, we are estimating that a catalyst will live at least a few days, possibly longer," says Aines. "Surviving the high temperature is the greatest challenge in designing an effective catalyst and will be the limiting factor with this technology.""

States Published Patent Application No. 2007/0169625 by Roger D. Aines and William L. Bourcier for a carbon ion pump for removal of carbon dioxide from combustion gas and other gas mixtures published Jul. 26, 2007 provides the state of technology information quoted below. The disclosure of United States Published Patent Application No. 2007/0169625 is incorporated herein in its entirety for all purposes.

"A major limitation to reducing greenhouse gases in the atmosphere is the expense of stripping carbon dioxide from other combustion gases. Without a cost-effective means of accomplishing this, the world's hydrocarbon resources, if used, will continue to contribute carbon dioxide to the atmosphere."

"A few major power plants around the world currently remove carbon dioxide from flue gas, for sale as an industrial product. Oil companies commonly remove carbon dioxide from natural gas to improve its energy content. In both cases the most common technology is temperature-swing absorption (TSA) using a methylated ethyl amine solvent (MEA)."

"The MEA process relies on the strongly selective bonding of carbon dioxide to the solvent for selective removal from the flue gas, but requires considerable heating to increase the gas pressure in the removal step to an acceptable level. In particular, the flue gas contacts the MEA dissolved in water in a packed column, and then the carbonated solution is heated to 120° C. to extract a nearly pure carbon dioxide gas. Sulfur and nitrous oxide are removed ahead of this step because they bind so tightly to the solvent that they cannot be removed. An alternative MEA cycle using pressure cycling can be used in some cases, when the inlet gas to be separated is at high pressure and the carbon dioxide can be removed from the solvent by lowering the ambient pressure. In both this process and the temperature swing process, the carbon dioxide fugacity is changed by changing the physical conditions of the solvent. This is inefficient due to the energy unrecoverably lost doing work on a large volume of solvent, in addition to the mechanically complex system and the need for frequent solvent addition due to degradation. It is a fundamentally complex and chemically-intensive process only suitable for large-scale industrial separation today and it is too expensive to contribute a globally-large removal of carbon from combustion sources."

"The Greenhouse Gas Program of the International Energy Agency (Davison et al. 2001) has studied the application of this technology to electric power plants. They estimate an energy cost of approximately 35% of the power generated by a pulverized coal power plant is required for this type of carbon dioxide removal. Many variants are under study, which permit slightly higher efficiency or longer solvent life, including solid sorbents; thus far, dramatic improvements have not been seen."

"Accordingly, a need exists for an improved process and system to control the removal of CO, in an economical and environmentally safe way. The present invention is directed to such a need."

SUMMARY

Features and advantages of the present invention will become apparent from the following description. Applicants are providing this description, which includes drawings and examples of specific embodiments, to give a broad representation of the invention. Various changes and modifications within the spirit and scope of the invention will become apparent to those skilled in the art from this description and by practice of the invention. The scope of the invention is not intended to be limited to the particular forms disclosed and the invention covers all modifications, equivalents, and alternatives falling within the spirit and scope of the invention as defined by the claims.

The present invention provides a system that substantially increases the efficiency of $CO_2$ capture and removal over current state of the art methods by positioning the catalyst within an optimal distance from the air-liquid interface. The present invention provides a system for removing carbon dioxide from a fluid wherein the dissolved carbon dioxide concentration varies with the depth of the liquid. The system comprises positioning a catalyst for removing the carbon dioxide within the layer determined to be the highest concentration of carbon dioxide. A hydrophobic tether is attached to the catalyst for removing the carbon dioxide wherein the hydrophobic tether modulates the position of the catalyst within the liquid layer containing the highest concentration of carbon dioxide.

In one embodiment the present invention provides an apparatus for removing carbon dioxide from a liquid which has carbon dioxide concentrations varying with the depth of the liquid. A catalyst for removing carbon dioxide is attached to a float portion and placed within this liquid. The layer of liquid targeted for positioning the tethered catalyst contains the highest concentration of carbon dioxide. In another embodiment the present invention provides an apparatus for removing carbon dioxide from a liquid which has carbon dioxide concentrations varying with the depth of the liquid wherein a target layer contains the highest concentration of carbon dioxide. A catalyst, and a hydrophobic tether attached to the catalyst are placed in the liquid wherein the hydrophobic tether modulates the position of the catalyst in the target layer of the liquid containing the highest concentration of carbon dioxide for removing. This strategic positioning of the tethered catalyst to the target layer increases the efficiency of carbon dioxide removal from the liquid.

The present invention has utility in any application where $CO_2$ removal from a fluid is desired. For example, the tethered catalysts of the present invention could be used in liquid storage tanks or reservoirs to remove dissolved $CO_2$ from gas mixtures produced by fossil fuel plants or other industrial processes. Also, the tethered catalyst could be incorporated into a liquid that would be sprayed into an industrial setting for $CO_2$ removal from a fluid mixture.

The invention is susceptible to modifications and alternative forms. Specific embodiments are shown by way of example. It is to be understood that the invention is not limited to the particular forms disclosed. The invention covers all modifications, equivalents, and alternatives falling within the spirit and scope of the invention as defined by the claims.

BRIEF DESCRIPTION OF THE DRAWINGS

The accompanying drawings, which are incorporated into and constitute a part of the specification, illustrate specific embodiments of the invention and, together with the general description of the invention given above, and the detailed description of the specific embodiments, serve to explain the principles of the invention.

DETAILED DESCRIPTION OF SPECIFIC EMBODIMENTS

Figure 1:
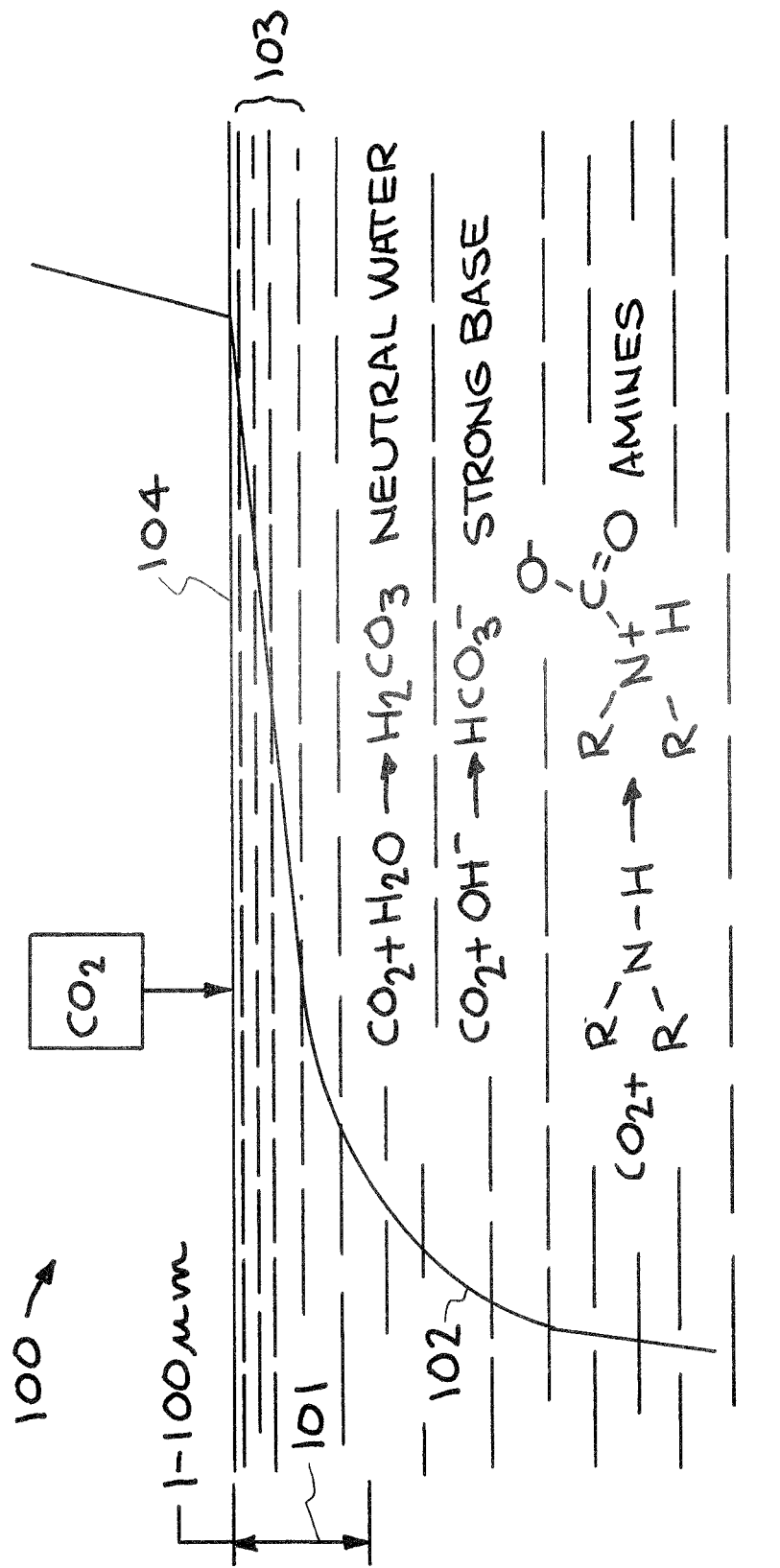
FIG. 1 illustrates a generalized concentration profile of $CO_2$ in a liquid, where the $CO_2$ concentration is highest at the top layer of liquid.

Referring to the drawings, to the following detailed description, and to incorporated materials, detailed information about the invention is provided including the description of specific embodiments. The detailed description serves to explain the principles of the invention. The invention is susceptible to modifications and alternative forms. The invention is not limited to the particular forms disclosed. The invention covers all modifications, equivalents, and alternatives falling within the spirit and scope of the invention as defined by the claims.

The present invention provides a system that substantially increases the efficiency of $CO_2$ removal over current state of the art methods by positioning the catalyst within an optimal distance from the air-liquid interface. The present invention has utility in any application where $CO_2$ removal from a fluid is desired. For example, the tethered catalysts of the present invention could be used in liquid storage tanks or reservoirs to remove dissolved $CO_2$ from gas mixtures produced by fossil fuel plants or other industrial processes. Also, the tethered catalysts could be incorporated into a liquid that would be sprayed into an industrial setting for $CO_2$ removal from a fluid mixture. In addition, the tethered catalysts could be used in natural settings, such as lakes, rivers or the ocean to assist in the removal of $CO_2$ from the top layer of the liquid.

Referring now to the drawings, and in particular to FIG. 1, an illustration shows that the highest concentration of $CO_2$ can be found at the top layer of a given liquid. The layer of the liquid designated by the reference numeral 101 is considered the top layer of the liquid. The curve 102 illustrated in FIG. 1 by reference numeral 102 depicts the concentration profile of $CO_2$ in a liquid. The $CO_2$ concentration depth profile 102 reveals the concentration dramatically decreasing at a depth below 100 μm, which explains why confining the catalyst at or near the gas-liquid interface 104 increases the overall efficiency of $CO_2$ capture and removal.

Applicant has discovered that carbon dioxide removal efficiency is improved when the catalyst is positioned in the top layer 101. Applicant has also discovered that carbon dioxide removal efficiency is maximized when the catalyst is positioned at the depth range of 0 to 15 μm from the gas-liquid interface 104. The depth range of 0 to 15 μm is designated by the reference numeral 103 in FIG. 1. The present invention enables the catalyst to be positioned within this layer of the liquid, which significantly increases the efficiency of the carbon dioxide removal.

One important feature of the present invention is that compared to current $CO_2$ removal systems, the Applicant's system significantly reduces the quantity of dissolved catalyst that would be required to achieve rate of $CO_2$ removal from the bulk liquid. This occurs through the strategic positioning of the catalyst near the top layer of the liquid where the highest concentration of $CO_2$ can be found, which significantly reduces the quantity of catalyst needed compared to if the catalyst was distributed throughout the depth of the fluid (i.e. dissolved catalyst). As shown in FIG. 1, the top liquid layers 101 and 103 designate the location of highest concentration of $CO_2$. Positioning the catalyst within this optimal zone (layers 101 and 103) of the liquid substantially increases the efficiency of $CO_2$ removal.

Preliminary calculations have indicated that the quantity of catalyst saved using the tethered catalyst over a catalyst dispersed throughout the liquid is on the order of 1:1,000,000,000. In other words, where it would require 1 gram of catalyst to remove a specified amount of $CO_2$ with the catalyst dispersed evenly throughout the liquid depth, the tethered catalyst would require only about 1 nanogram to remove this same amount of $CO_2$. Consequently, optimizing the catalyst's location to the top layer of the liquid dramatically decreases the quantity of catalyst required for the reaction, which in turn reduces the cost of $CO_2$ removal.

Figure 2:
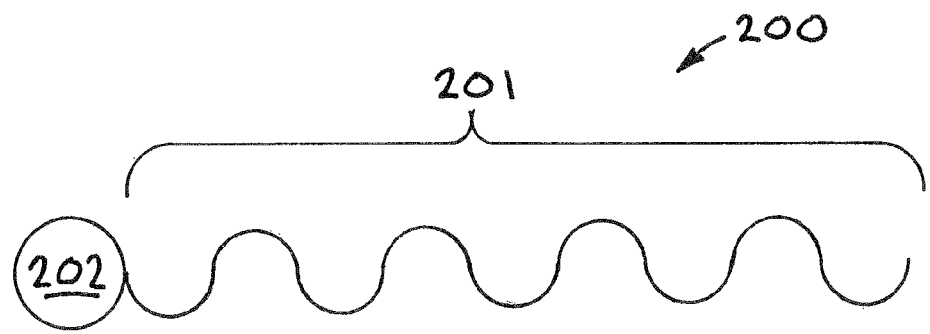
FIG. 2 illustrates the components of one of the tethered catalysts, including the catalyst and the hydrophobic tether.
Figure 3:
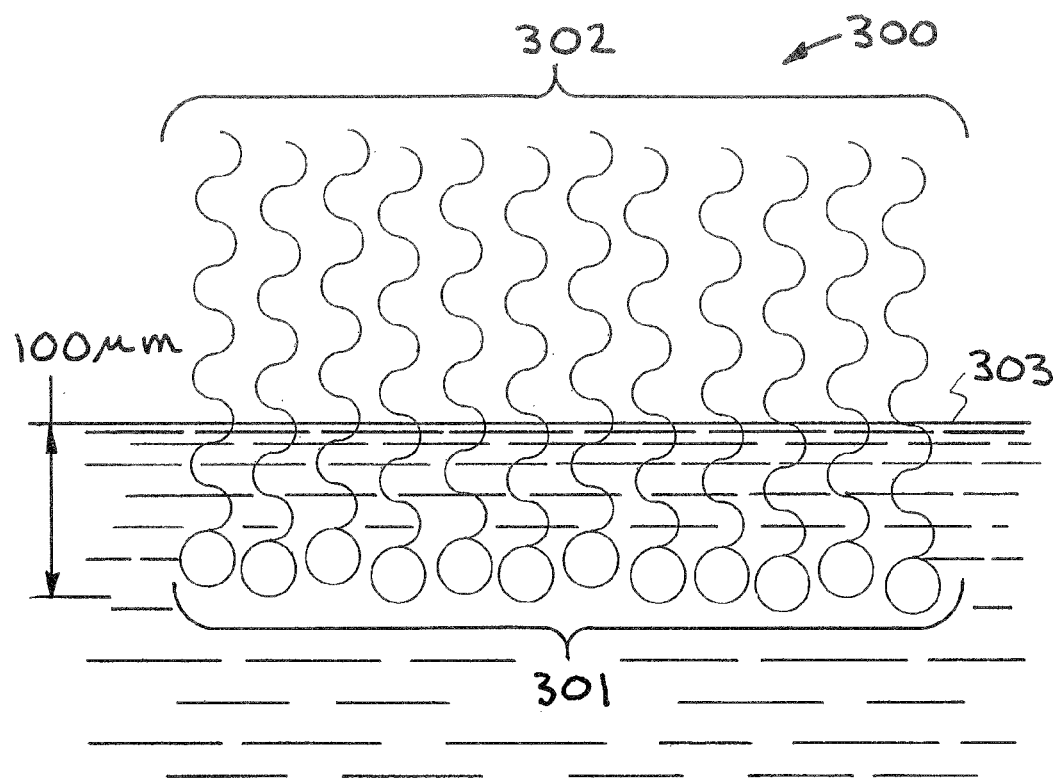
FIG. 3 illustrates the placement and orientation of one of the tethered catalysts shown in FIG. 1 when placed in a liquid.

The isolation of the catalyst's location to the top layer of a liquid is achieved through the attachment of a hydrophobic "tail" or "tether" to the catalyst. The tethered catalyst is illustrated in FIG. 2, with numeral 200 representing the general structure of the tethered catalyst molecule. The hydrophobic tail 201 serves as a floating device for the catalyst 202 by decreasing the overall density of the catalyst. When the tethered catalyst's density is lower than that of the surrounding liquid, its position is buoyed to the surface of the liquid. In addition, due to the surfactant-like nature of the tether, it was anticipated and later shown by the Applicants that the tethered catalyst adopts the desired orientation with the hydrophobic tether oriented into the air while the actual catalyst remains within the fluid layer. A schematic illustration of how tethered catalysts would be situated in a liquid can be seen in FIG. 3, with numeral 300 depicting the catalyst's position in the liquid generally. The catalyst 301 floats within the top layer of the liquid with the attached hydrophobic tail 302 extending upwards through the gas-liquid interface 303.

The designed synthetic routes for attaching the tether to the catalyst are flexible, and these are generally achieved through the union of reactive sites in both, the tether and the catalyst. The chemistry of the attachment is well documented in the literature (Bayer et al. 1974; Baker et al. 2002; Baker et al. 2005; Baker et al. 2006). If needed, a "spacer" can be introduced as a second functionality lying in between the hydrophobic, carbon chain section of the tether and the catalyst. Although an aminobenzyl spacer is frequently used, many other chemically stable spacers could be used such as heterocyclic linkers like pyridines, triazoles, oxazoles, etc.

The preferred composition of the hydrophobic tether is a linear aliphatic chain, ranging in length from $C_{10}$ to $C_{18}$. The selected length of the chain alters the overall density of the molecule, with the longer chains decreasing the overall solubility of the molecule compared to the shorter chains. Accordingly, the selection of the length of the hydrophobic tether, serves as one mechanism to modulate the catalyst's depth in the liquid for optimal $CO_2$ removal.

Another mechanism for controlling the catalyst's depth in the liquid is through the addition of hydrophilic elements within the tether. The hydrophilic elements would be added to the tether in a position adjacent to the catalyst. The addition of these hydrophilic elements would serve to increase the catalyst solubility and serve as a way to counter some of the buoyancy provided by the hydrophobic tail, if desired. The preferred hydrophilic element comprises ethylene glycol units or polyethylene glycol (PEG). Approximately 1 to 15 ethylene glycol units could be used for tuning the catalyst's solubility properties, and hence, catalyst depth in the liquid.

Ideally the tethered catalysts are lined up in a discrete, uniformly compact monolayer. This "comb-like" organization of the tethered catalyst on the liquid surface permits the highest concentration of catalyst per given area. Degrees of unsaturation for the carbon chain bonding of the tether should be minimized since unsaturated bonds tend to distort linearity and would prevent the tethered catalyst from associating in a compact, orderly fashion. Altering the length of the carbon chain can also affect the ability to arrange the tethered catalysts in a comb-like fashion. Shorter chains (e.g. $C_3$-$C_6$) will tend to form from micelles rather than a discrete, uniform layer.

Once immersed in liquid, the catalyst works by lowering the activation energy of the targeted reaction without being consumed in the process. The catalyst increases the reaction rate of the $CO_2$ hydration reaction to yield water-soluble bicarbonate. The general, simplified version of this reaction is depicted below:

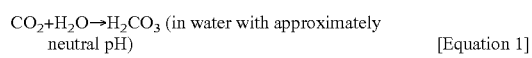

$$CO_2 + H_2O \rightarrow H_2CO_3 \text{ (in water with approximately neutral pH)} \quad \text{[Equation 1]}$$

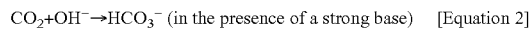

$$CO_2 + OH^- \rightarrow HCO_3^- \text{ (in the presence of a strong base)} \quad \text{[Equation 2]}$$

As illustrated in the above reactions (Equations 1 and 2), in water with an approximately neutral pH value, the catalyst will increase the conversion of $CO_2$ into carbonic acid ($H_2CO_3$). In a basic solution, the catalyst will increase the reaction rate of converting $CO_2$ into bicarbonate ($HCO_3^-$). This formation of $HCO_3^-$ in a basic solution occurs in an irreversible fashion, eliminating the possibility of regenerating any $CO_2$ gas.

Catalysts with metal active sites are well suited for carbon dioxide removal. Although the zinc (II) metal ion (Zn) is frequently the species of choice due to its presence in the enzyme carbonic anhydrase's active site, other metals could easily be substituted, such as but not limited to nickel (Ni), cobalt (Co) or copper (Cu). The metal ion within the catalytic center is coordinated to a water molecule. The pKa values of the metal coordinated water molecule for most catalysts considered in this invention range from 7-10 approximately depending on the metal as well as the nature of the ligand chelating it. Predicting the rates of the above $CO_2$ removal reactions requires knowledge of the pH of the solution, as well as the pKa values of the water coordinated to the metal center in the catalyst. Another factor that also plays a role in the overall rate of the reaction is the catalyst's solubility in the medium of interest, with catalysts bearing optimal solubilities in the targeted fluids expected to perform better than those that have solubility issues.

In a basic solution, such as the one that exists in most industrial environments, where the pKa of the selected "catalyst" is lower than the pH of the solution, the water molecule coordinated to the metal ion becomes a hydroxide as a result of deprotonation by the basic solvent. The residual coordinated hydroxide ion is electron rich and consequently nucleophilic. Furthermore, its nucleophilicity is enhanced even further via its coordination to the metal center. In the presence of $CO_2$, the carbon atom in $CO_2$ undergoes a nucleophilic addition reaction by the hydroxide ion. The result, as depicted in the above chemical reaction, is the formation of $HCO_3^-$. When the pH value of the solution equals the pKa of the water coordinated to the metal catalytic center, equilibrium will exist with 50% of the species existing as hydroxide coordinated to the metal center and the other 50% will have the $H_2O$ molecule coordinated to the metal center. In these conditions a mixture of $H_2CO_3$ and $HCO_3^-$ will be formed.

Figure 4A:
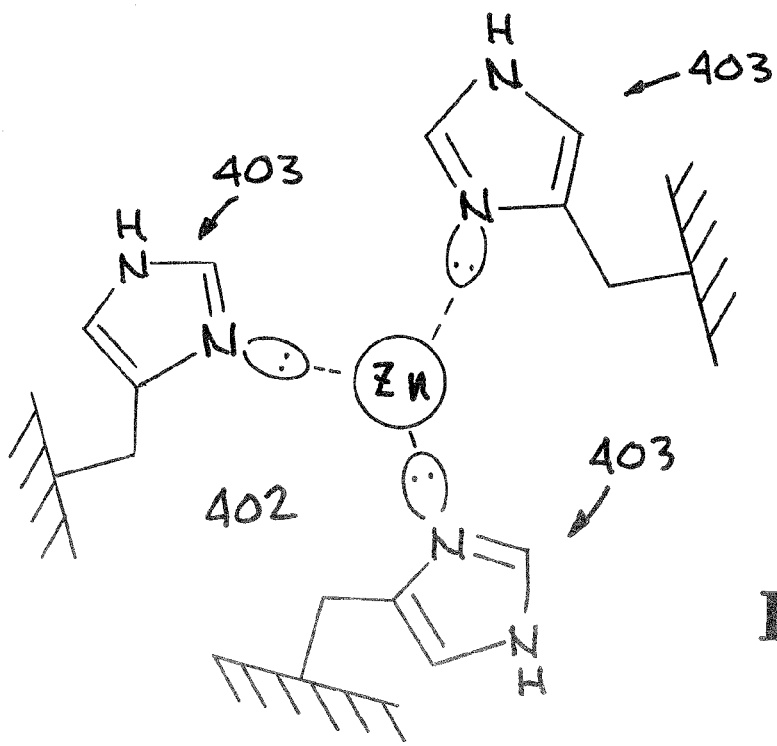
FIG. 4A-B portrays the natural enzyme, carbonic anhydrase and the components of its catalytic center as well as a synthetic biomimetic small molecule catalyst.

The fastest natural enzyme known, carbonic anhydrase (CA), has a catalytic nucleus consisting of a metal active site ideal for carbon dioxide removal. Referring now to FIG. 4A, the catalytic center of CA is designated generally by reference number 400. The CA catalytic center includes a metal ion 401, usually zinc, coordinated by three Histidine residues 402 in addition to a water molecule giving the zinc metal center a tetrahedral-like geometry. The use of CA in industrial settings has not been successful since as any other mammalian enzymes it readily denatures in conditions typically present in industrial settings (e.g. high temperatures well above 37° C., high pressures and saturated salt concentrations). Current state of the art $CO_2$ removal systems address the CA stability issue by immobilizing the enzyme on a stationary solid support, separated from the fluid phase of the industrial process to improve stability and prevent the enzyme from being denatured. This approach places the enzyme away from the gas-liquid interface where the highest concentration of dissolved $CO_2$ resides; this in consequence, dramatically compromises the effectiveness of $CO_2$ removal by the system.

Figure 4B:
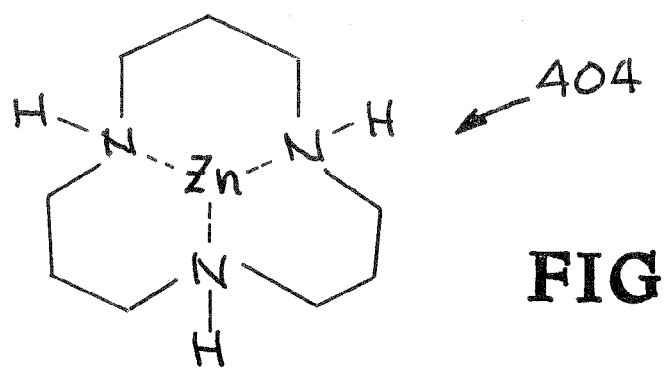
Figure 5A:
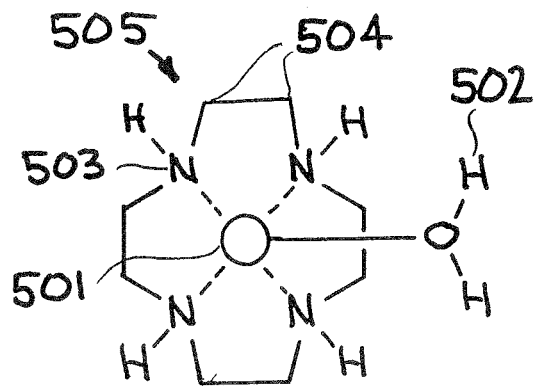
FIG. 5A-5E illustrates some examples of aza-macrocycle catalysts, which are robust but effective synthetic catalysts capable of implementation in industrial settings.
Figure 5B:
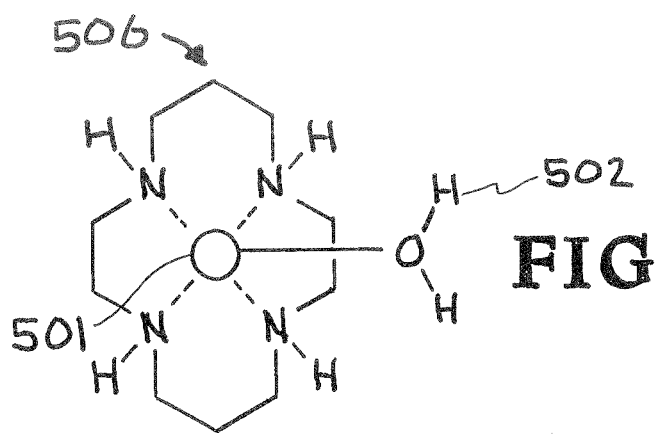
Figure 5C:
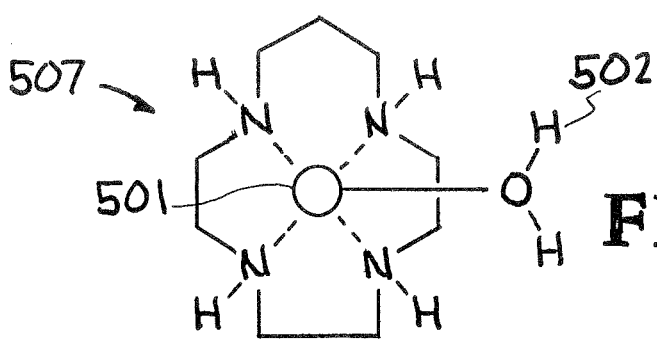
Figure 5D:
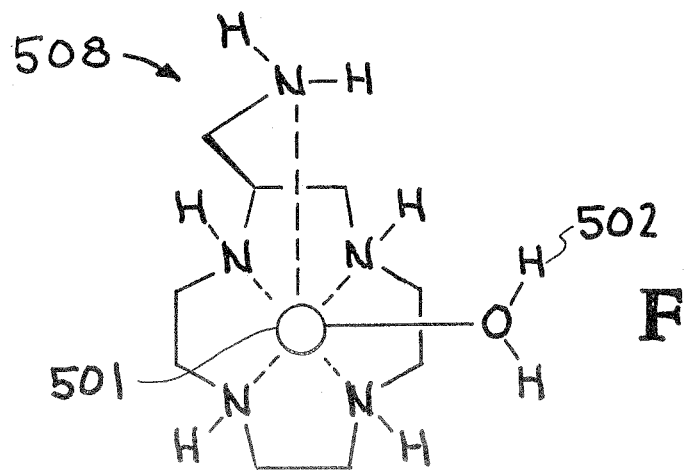
Figure 5E:
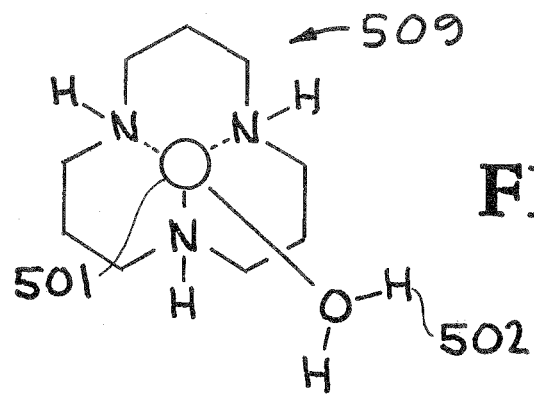

In order to utilize tethered catalysts in industrial settings, synthetic catalysts are designed specifically to withstand harsh conditions. These synthetic catalysts have been synthesized not only to mimic the CA's active site in carrying out the $CO_2$ hydration reaction, but to withstand the immensely harsh conditions encountered in industrial processes, eliminating the need of molecular scaffolding designed to protect the catalytic center. An example of one of these synthetic catalysts is portrayed in FIG. 4B with the catalyst designated generally by numeral 403. These synthetic catalysts can be added directly to the fluid phase of an industrial process in conditions where a natural enzyme would not otherwise survive. Aza-macrocyclic catalysts are one group of synthetic catalysts shown to be robust enough to tolerate industrial conditions and yet still rapidly remove $CO_2$ from a fluid.

FIG. 5 illustrates some examples of zinc-containing aza-macrocyclic ligands demonstrated to catalyze the carbon dioxide hydration reaction. The catalysts illustrated in this figure make up a small percentage of the catalysts synthesized for use in the present invention. The metal ion 501 depicted in these examples is zinc (II), although other metals can be used, such as but not limited to nickel (Ni), copper (Cu) or cobalt (Co). The metal ion in the catalytic center will be coordinated to a water molecule 502. Each aza-macrocyclic is composed of 3 to 4 nitrogen atoms linked together by carbon atoms. The number of nitrogen atoms 503 and corresponding carbon atoms 504 serve to distinguish the aza-macrocycles from each other. For example, in FIG. 5A, cyclen generally depicted by numeral 505 has four nitrogen atoms in its structure, with each nitrogen atom linked by two carbon atoms. Alternatively, in FIG. 5B, the structure of cyclam, generally depicted by numeral 506, features two and three carbon atoms linking the four nitrogen atoms together. In FIGS. 5C and 5D, Hybrid-Zn and C-methylamino cyclen-Zn generally depicted by numeral 507 and 508, respectively, also have four nitrogen atoms linked by two or three carbon atoms. Finally, in FIG. 5E, 1,4,7-Triaza Cyclodecane-Zn, generally depicted by numeral 509 has three nitrogen atoms, each linked together by three carbon atoms.

The sterics, conformation and metal-nitrogen bond distances of each aza-macrocycle is unique and generates an exclusive, corresponding pKa value for each of the zinc-coordinated water molecule 502. For the present invention the pKa values of the catalysts utilized will range from 7-10 approximately. As expected, the pKa value of the coordinated water molecule relative to the pH of the solution influences the speed at which the $CO_2$ removal reaction takes place. The aza-macrocycle catalyst selected for use in the present invention will depend on the complex best suited for the particular environmental conditions where the removal will take place.

The present invention is further illustrated in the following examples. The examples illustrate some potential variations of the components of the tethered catalyst molecule. The examples provided are a small selection of potential variations of the components of the invention and are not meant to limit the invention to the species shown. For instance, although cyclen is the catalyst used in these examples, other catalysts, such as, but not limited to those depicted in FIG. 5 could easily be substituted.

Example 1

Figure 6:
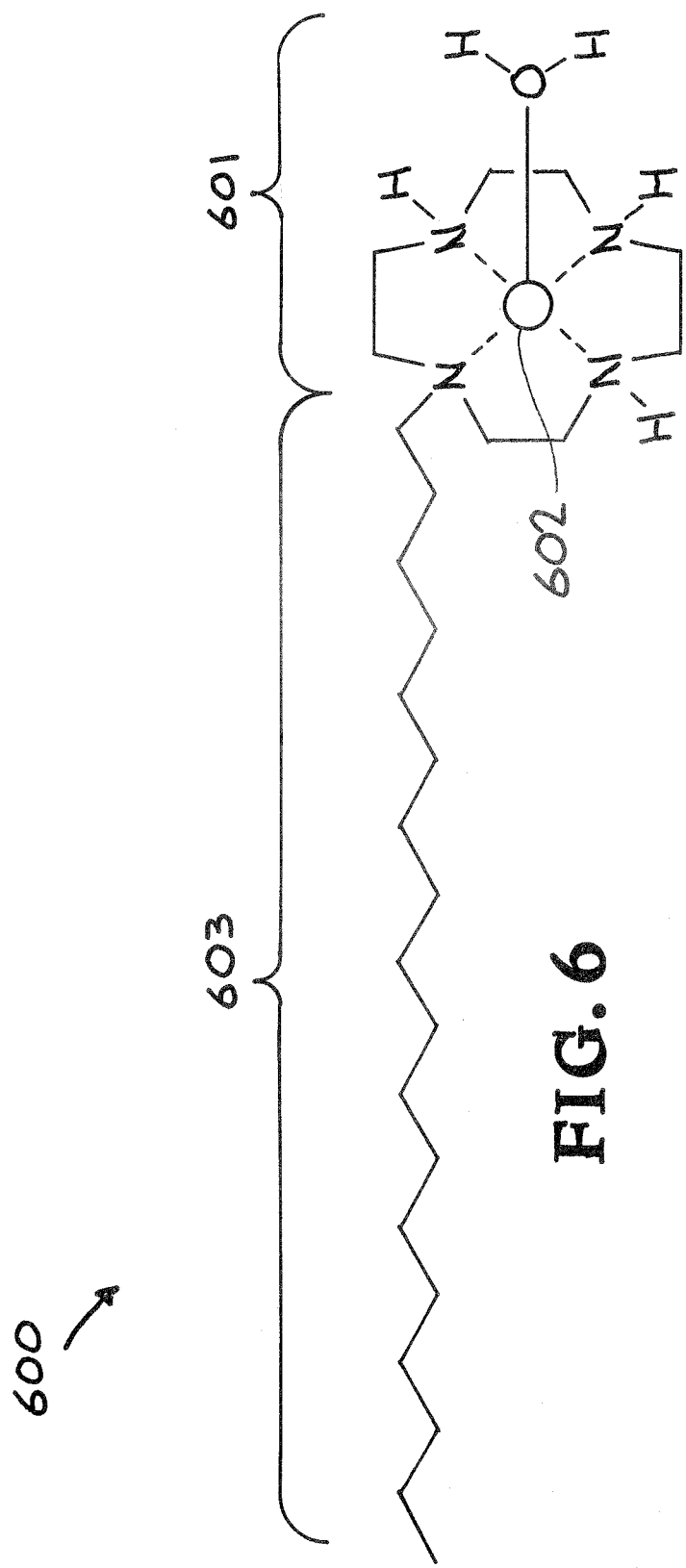
FIG. 6 illustrates the chemical structure of the tethered catalyst, $C_{10-18}$—N-Cyclen Zinc.

In example 1, the tethered catalyst, $C_{18}$—N-Cyclen-Zn, is composed of the aza-macrocyclic complex, cyclen, and a $C_{18}$ alkyl chain for the hydrophobic tether section. Example 1 is illustrated by FIG. 6. The tethered catalyst is designated generally by the reference numeral 600. The catalyst 601 in this example, cyclen, is an aza-macrocyclic complex with four nitrogen atoms coordinated to zinc 602, which is also coordinated to a water molecule. The tether 603 in this example is purely hydrophobic, comprising an alkyl chain of 18 carbon atoms.

Figure 7:
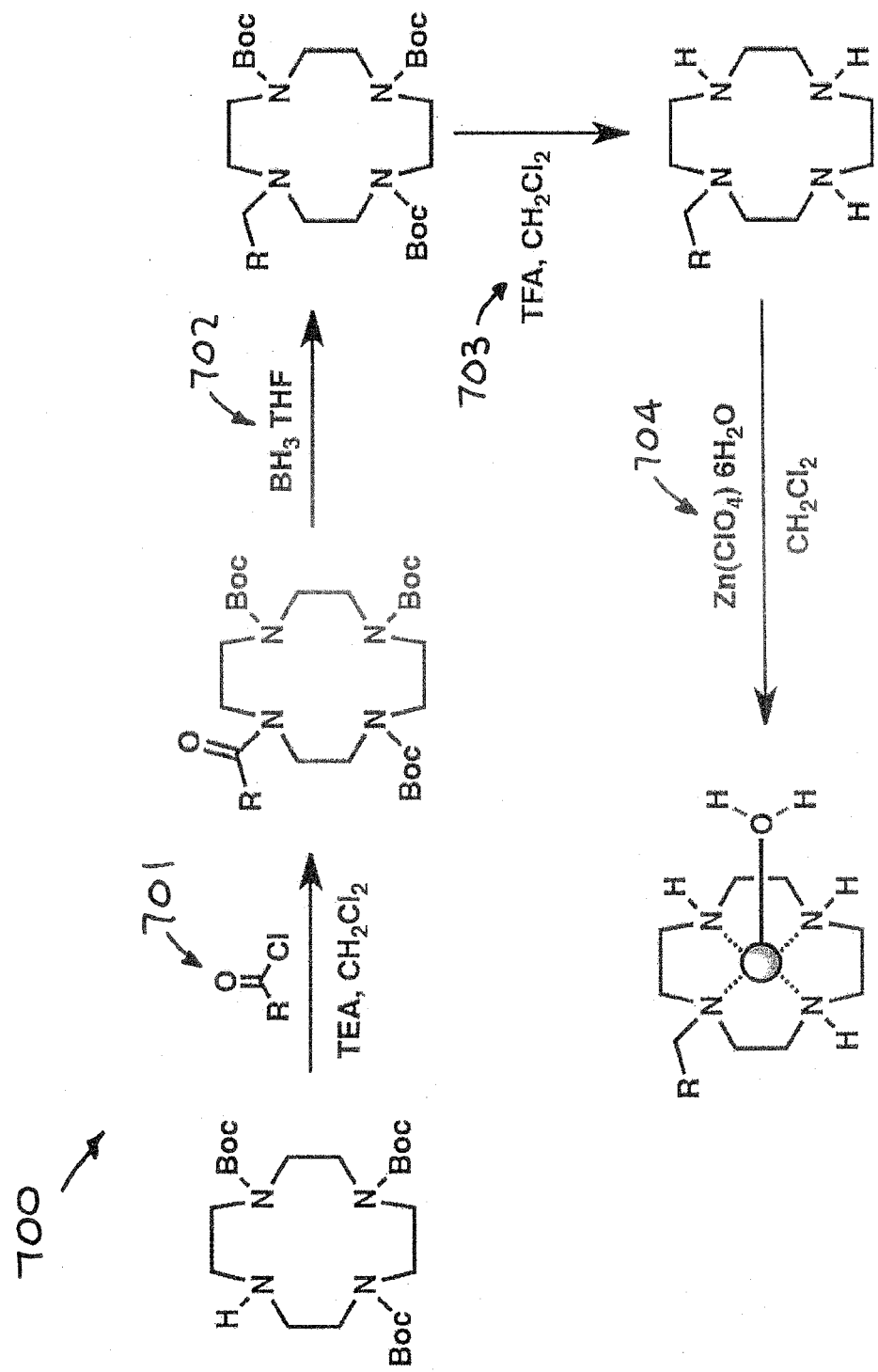
FIG. 7 illustrates the steps involved in the synthesis of the tethered catalyst, $C_{10-18}$—N-Cyclen Zinc.

The synthesis of $C_{10\text{-}18}$—N-Cyclen-Zn is illustrated in FIG. 7, with this particular synthetic pathway being designated generally by reference numeral 700 and proceeding according to the following potential steps:

Step 1: Begin with the alkylation 701 of tris-N-t-butyloxycarbonyl (Boc) cyclen compound using an acyl chloride (R=$C_{10\text{-}18}$).

Step 2: This yields an amide-containing molecule which is then reduced 702 to an amine with borane-THF.

Step 3: The Boc groups are removed 703 with trifluoroacetic acid in an organic solvent like dichloromethane or chloroform.

Step 4: The resulting tethered cyclen compound is basified and treated 704 with zinc (II) perchlorate hexahydrate to furnish the zinc(II)-containing catalyst.

Example 2

Figure 8:
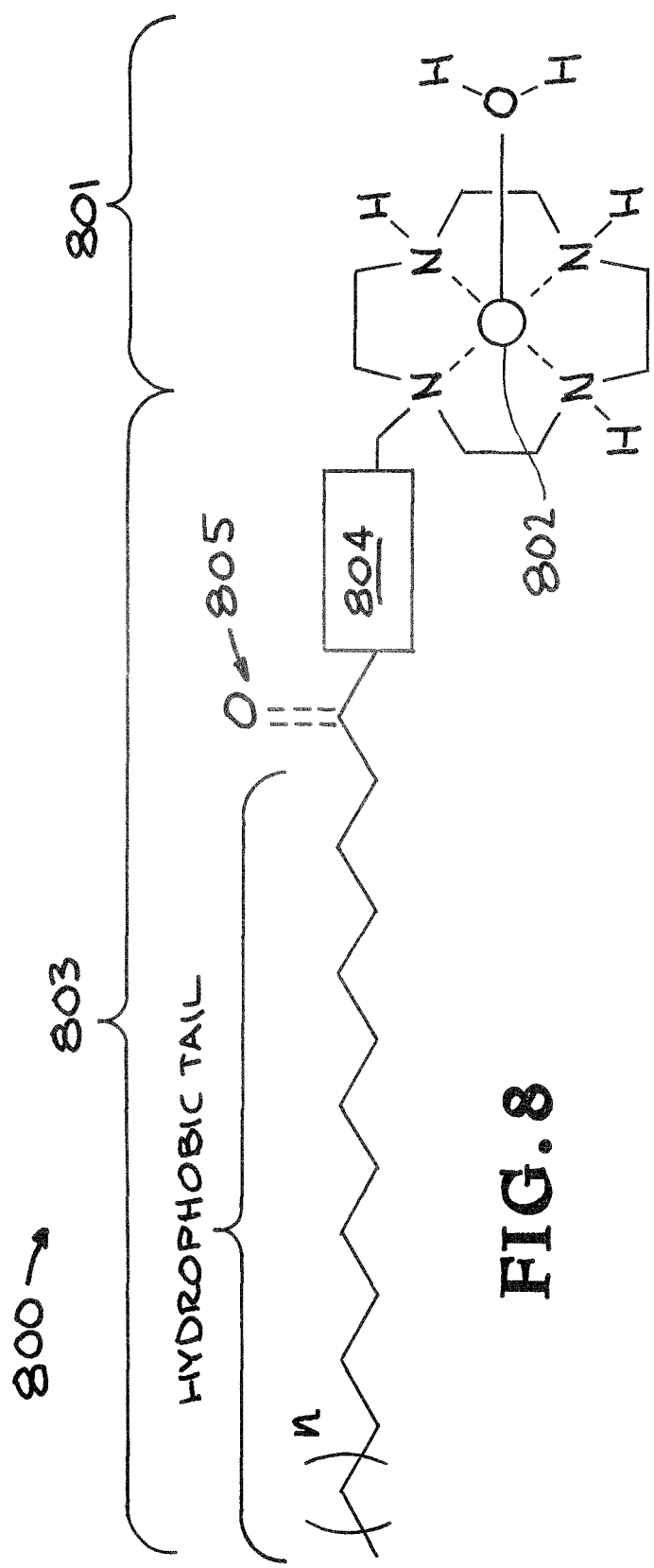
FIG. 8 illustrates the general chemical structure of the tethered catalyst comprising cyclen as the catalyst and a purely hydrophobic tail made of a carbon chain ranging from 10 to 18 atoms in length, as well as, optional spacers resulting from the functional group reaction performed for attachment.

In example 2, as in the preceding example, the tethered catalyst is composed of cyclen and attached to a carbon chain tether, but this example includes an optional spacer linked to the tether section by an amide link. Example 2 is illustrated by FIG. 8. This example of the tethered catalyst is designated generally by the reference numeral 800. As in the past example, the catalyst 801 in this example is cyclen with a zinc metal 802 coordinated to a water molecule. The tether 803 is composed of the carbon chain, ranging from $C_{10}$-$C_{18}$, (e.g. n=1 for $C_{10}$, n=9 for $C_{18}$) an optional spacer 804 and an amide linkage 805.

Example 3

Figure 9:
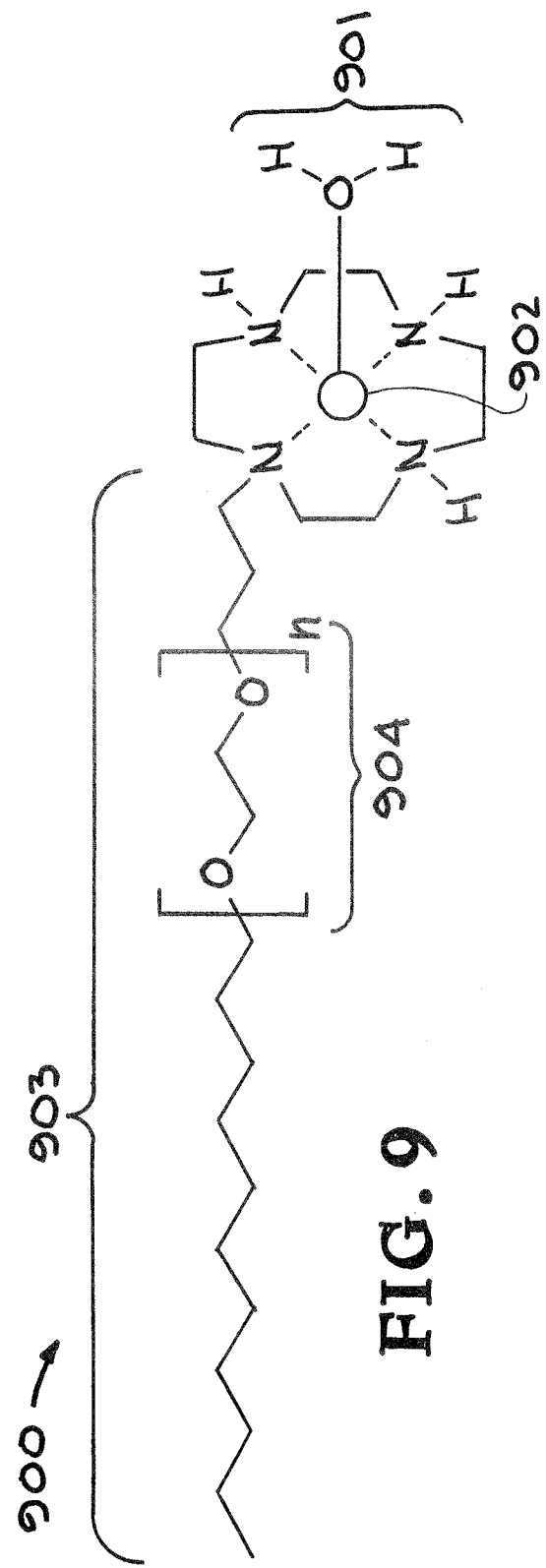
FIG. 9 illustrates the chemical structure of the tethered catalyst comprising cyclen as the catalyst and a hydrophobic tail made of a carbon chain 10-18 atoms in length and hydrophilic elements added to the tether adjacent to the catalyst.

In example 3, the tethered catalyst, $C_{10-18}$-PEG-N-Cyclen-Zn, is composed of the cyclen core attached to a carbon chain tether, which this time includes the optional hydrophilic spacer. Example 3 is illustrated by FIG. 9. This example of the tethered catalyst is designated generally by the reference numeral 900. As in the past example, the catalyst 901 is cyclen with a zinc metal center 802 coordinated to a water molecule. The tether 903 comprises a hydrophobic carbon chain ranging in length from 10 to 18 carbon atoms long, in addition to a hydrophilic spacer 904, represented by a PEG unit that can vary in length.

A potential synthetic pathway for the tethered catalyst, $C_{10}$-$C_{18}$-PEG-N-Cyclen-Zn, could follow these potential steps:

Step 1: Begin with the alkylation of a tris-N-t-butyloxycarbonyl cyclen compound with a commercially available, alkyl modified PEG-containing alkyl iodide.

Step 2: Once the alkylation has been carried out, removal of the Boc groups in the cyclen core can be achieved via trifluoroacetic acid treatment in dichloromethane or chloroform.

Step 3: The resulting tethered cyclen compound is then treated with zinc(II) perchlorate hexahydrate to furnish the desired zinc(II)-containing catalyst.

Example 4

Figure 10:
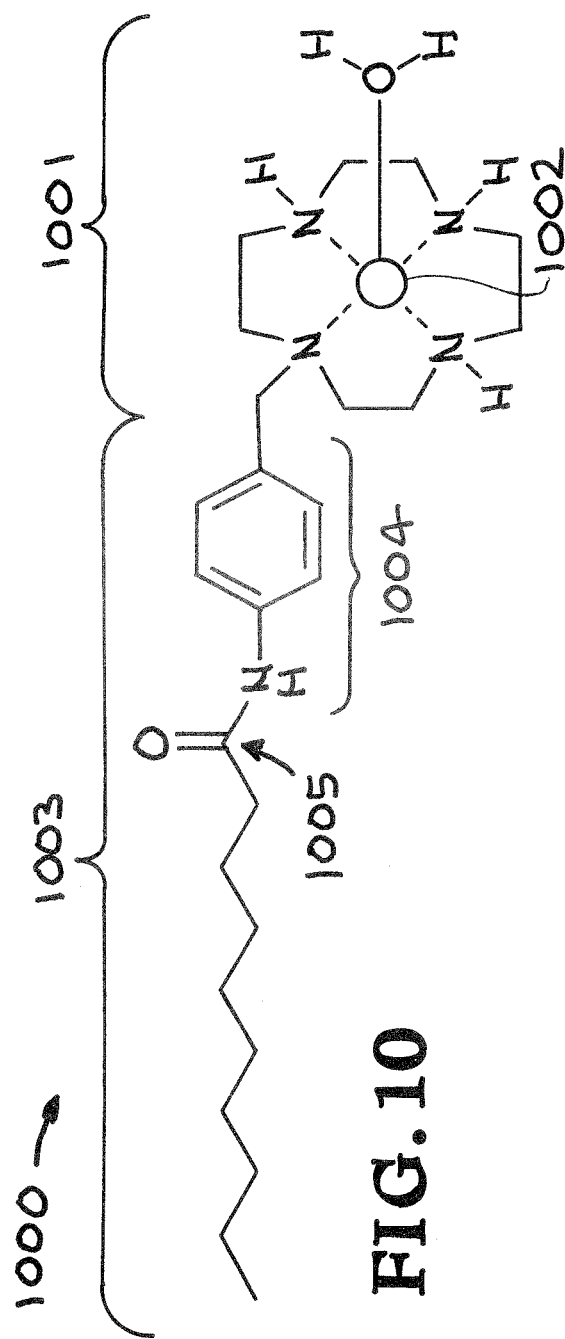
FIG. 10 illustrates the chemical structure of the tethered catalyst comprising the Zn(II)-cyclen unit as the catalyst and a purely hydrophobic tail made of a carbon chain 18 atoms in length, including the optional p-aminobenzyl spacer and acyl linkage.

In example 4, the tethered catalyst, $C_{10}$-pABn-N-Cyclen-Zn, comprises the cyclen core, attached to a 10 carbon atom alkyl chain tether, which includes both the optional p-aminobenzyl spacer linked to the hydrophobic tether via an amide linkage. Example 4 is illustrated by FIG. 10. This example of the tethered catalyst is designated generally by the reference numeral 1000. As in the past examples, the catalyst 1001 in this example is cyclen with a zinc metal center 1002 coordinated to a water molecule. The hydrophobic tether 1003 is composed of a carbon chain, $C_{10}$, and the optional p-aminobenzyl spacer 1004, linked to the hydrophobic tether via an amide linkage 1005.

Figure 11:
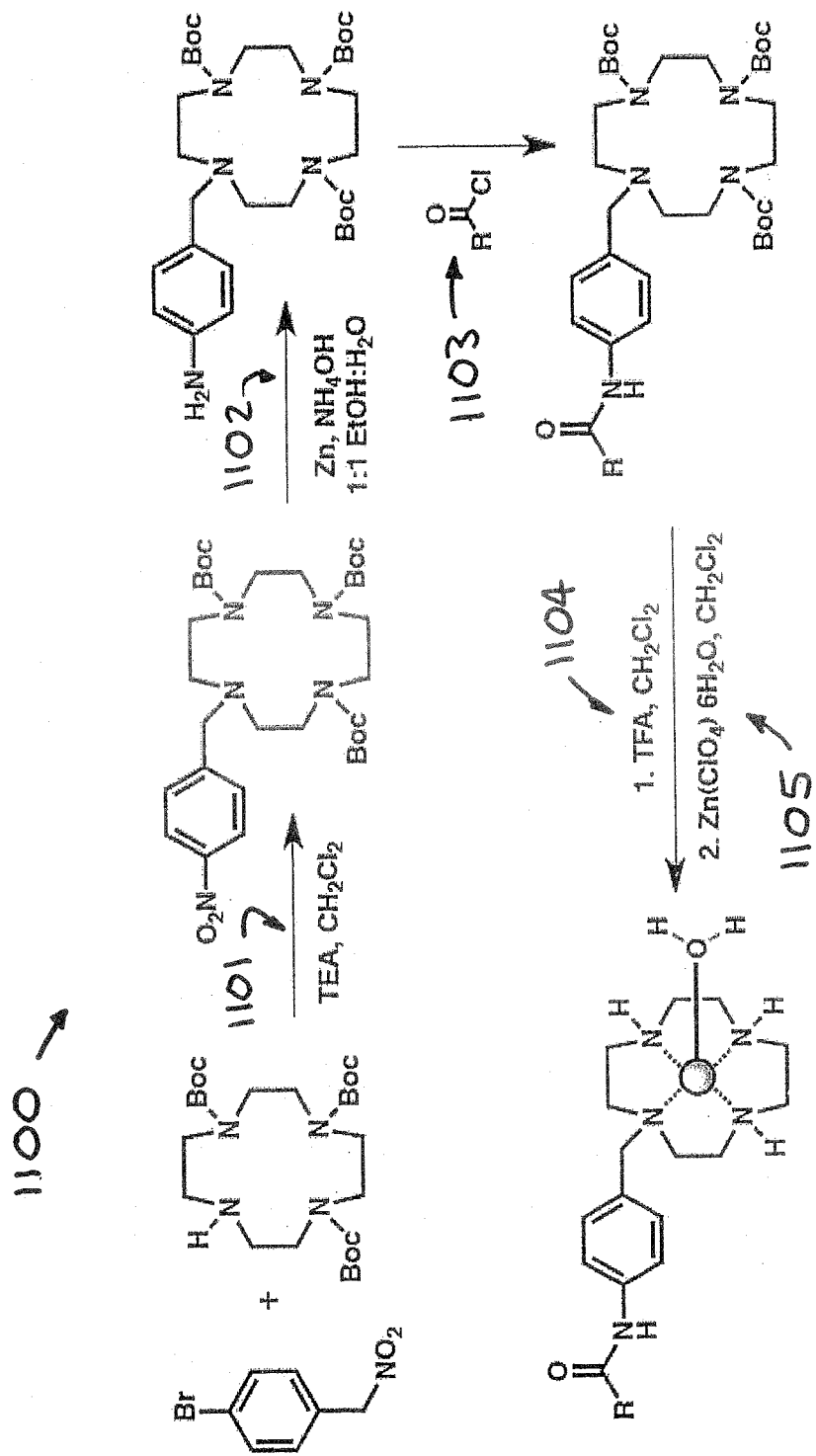
FIG. 11 illustrates the steps involved in the synthesis of the tethered catalyst, $C_{10-18}$-pABn Cyclen-Zinc, which include the optional p-aminobenzyl spacer and acyl linking unit.

The synthesis of $C_{10}$-pABn-N-Cyclen-Zn is illustrated in FIG. 11, with this particular synthetic pathway being designated generally by reference numeral 1100 and proceeding according to the following potential steps:

Step 1: Begin with the alkylation 1101 of tris-N-t-butyloxycarbonyl cyclen with p-nitrobenzyl bromide.

Step 2: After alkylation, the nitro group is subsequently reduced 1102 to the amino group using zinc powder in the presence of ammonium hydroxide in a water:methanol mixture.

Step 3: Acylation 1103 of the amine at this point can be carried out by using the desired acyl chloride in pyridine (R=$C_{10-18}$).

Step 4: This acylation is followed by acidic deprotection 1104 of all three Boc groups in the cyclen core using trifluoroacetic acid in dichloromethane or chloroform.

Step 5: Finally, zinc installation 1105 onto the tethered molecule is performed with zinc(II) perchlorate hexahydrate.

As previously discussed, the present invention substantially increases the efficiency of $CO_2$ removal over contemporary methods by positioning the catalyst within an optimal distance from the air-liquid interface. Since the highest concentration of $CO_2$ occurs at the top layer of the liquid, positioning the catalyst within this zone substantially increases the efficiency of $CO_2$ capture and removal. In addition, significantly less catalyst is required compared to if a soluble form of the catalyst was dispersed throughout the bulk of the liquid. In a basic solution, the catalyst converts $CO_2$ into bicarbonate ($HCO_3^-$) in an irreversible reaction, eliminating the risk of any $CO_2$ regeneration.

This optimization of the catalyst's location within the top layer of a liquid is achieved through the attachment of a hydrophobic tail to the catalyst. This attachment enables the catalyst to float within the top layer of the liquid with the attached hydrophobic tail extending upwards through the gas-liquid interface while the catalytic core remains submerged in the liquid phase. The length of the hydrophobic tail can be adjusted to ensure that the catalyst is strategically positioned within the top layer of the liquid. The addition of hydrophilic elements to the tether can also aid in carefully adjusting the catalyst's position within this top layer of the liquid where the concentration of $CO_2$ is at its highest.

The catalyst selected for use with the present invention would depend on the environmental conditions where the reaction would be taking place. The fastest natural enzyme known, CA, has not proven effective in industrial application as it readily denatures in the harsh conditions encountered in industrial processes. The present invention incorporates alternative synthetic catalysts for this purpose. The synthetic catalysts are designed to mimic the active site of CA and thus its activity, so that the number of reactions catalyzed per second is maximized, yet providing these synthetic catalysts with the property of successfully withstand the rugged industrial conditions. This enables the synthetic catalyst to be added directly to the fluid phase of an industrial process in conditions where a natural enzyme would otherwise be denatured (e.g. high pressure, elevated temperatures and saturated salt concentrations encountered in industrial settings).

The present invention provides a system that substantially increases the efficiency of $CO_2$ removal over current state of the art methods by positioning the catalyst within an optimal distance from the air-liquid interface The concentration profile of $CO_2$ in a liquid reveals the concentration dramatically decreasing at a depth below 100 μm, which explains why confining the catalyst at or near the gas-liquid interface increases the overall efficiency of $CO_2$ removal.

The present invention provides a catalyst optimized for $CO_2$ capture and removal, comprising: a catalyst structurally modified to support attachment to a water-soluble tether; one end of said tether covalently attached to said catalyst; and a hydrophobic entity attached to the free end of said tether, wherein said hydrophobic entity varies with said catalysts buoyancy requirements. The present invention also provides a process for $CO_2$ capture and removal, comprising the steps of: structurally modifying a catalyst to support attachment to a water-soluble tether; covalently attaching one end of said tether to said catalyst; covalently attaching the free end of said tether to a hydrophobic entity using a functional group reaction, wherein said hydrophobic entity varies with said catalysts buoyancy requirements; inserting said catalyst into a $CO_2$ polluting source; and extracting the said catalyst subsequent to $CO_2$ hydration but prior to desorption.

The present invention provides the optimization of catalyst location to provide for a more efficient utilization of the catalyst. Because the highest concentration of dissolved $CO_2$ is near the surface of the liquid, the gas-liquid boundary is the optimal location for the catalyst, but to hold the catalyst at this interface entails additional design requirements. In one embodiment the approach is to modify a catalyst by converting it to a tethered catalyst that is linked to a support structure (e.g. microscopic floats or hydrophobic groups) that concentrates the catalyst at the gas-liquid boundary. The tethering approach can be used to locate small molecule synthetic catalysts or directly to biological catalysts (e.g metalloproteins such as carbonic anhydrase).

The present invention provides a dissolved or entrained catalyst optimized for carbon dioxide sequestration, comprising: a catalyst means for carbon dioxide capture and removal; a float means for concentrating said catalyst means at the gas-liquid boundary; and a linking means covalently attached to said catalyst means and to said float means. The present invention also provides a catalyst optimized for removal of a target substance in a liquid, comprising: a catalyst structurally modified to support the attachment of a hydrophobic tether; one end of said tether attached to said catalyst wherein said tether length and composition vary with said catalyst's buoyancy requirements; and said target substance reacts with said catalyst resulting in said target substance sequestration.

Structural modifications to the catalyst (in this case, both small molecule analogs or an enzyme) allows them to be held at specific locations through the use of short chain oligimeric tethers. The utilization of tethers to catalysts with experimentally demonstrated performance is applied to two primary designs developed by Applicant. The first involves covalent attachment to the surface of very small particles that move with the solvent yet can be easily extracted before thermal desorption. Prior process analysis indicates that direct attachment to a stationary support (immobile relative to the fluid phase) does not offer a practical approach. However, attachment to particles that are allowed to slurry freely in the fluid phase is a viable option and will also permit catalysts that are more rugged with respect to specific chemical conditions, with less of the design envelope required to protect the catalyst from the higher temperature regimes of the desorber system.

The second design is attaching hydrophobic "tails" to the tether molecule so that the soluble catalyst is held at the gas-water interface. In this scenario, it can be envisioned that the catalyst could be skimmed from the contactor prior to desorption or move through the process along with the solvent (thereby being usable in equipment similar to that in use today). As such, these tethered catalyst systems promise very high utilization efficiency but may require changes in industrial practice. The tethering approach can be used with small molecule synthetic catalysts or biological catalysts (e.g metalloproteins such as carbonic anhydrase). Preliminary calculations using polyethylene glycol (PEG) groups on a cyclo-aza catalyst molecule has shown that such tethers do not deform the catalyst and should therefore preserve full functionality.

Tethering strategies may encompass multiple approaches. The first is modify the dissolved or entrained catalyst structure either during the original synthesis or after formation in order to support attachment of a tether. Next the covalent linking of a water-soluble tether [e.g., polyethyleneglycol (PEG)]. Literature precedence shows that an oligimer of 40-70 glycol repeat units is adequate to allow the catalyst to experience an environment that is substantially equivalent to free dissolution (Bayer et al. 1974; Baker et al. 2002; Baker et al. 2005; Baker et al. 2006). This has also been computationally verified by Applicant. In addition, Applicant has done preliminary calculations using an oligimeric PEG group attached to a tetrazamacrocylic species at multiple locations and has shown that such tethers do not deform the catalytic center, meaning that it should maintain full functionality. For this approach, both homo- and hetero-bifunctional PEGs in the appropriate length range are commercially available and are employed.

The final step can be comprised of attachment of the free end of the tether to either particles or to a hydrophobic tail. The nature of the attachment functionality is flexible and can be that of most generic functional groups or again a chemoselective unit, such as a terminal alkyne, that can react with azide-modified hydrophobic entities in a 1,3 dipolar fashion (i.e., click chemistry). The requirements of the final hydrophobic "buoy" can be experimentally evaluated and will be dictated by the specific catalyst (size, solubility, small molecule native protein, etc.). The hydrophobic entities may be chosen from well known groups such as (for example): long chain alkyls or arachidyl carbon acids or alcohols with successively longer aliphatic chains or phospholipids that employ two such aliphatic chains; or cholesterol moieties, tethered to the catalyst. This will allow for the imparting of varying degrees of hydrophobicity to position any specific catalyst within an optimal distance from the air-liquid interface. As noted earlier, these entities may be attached to the catalyst through an intermediate PEG linker, if necessary, to preserve water solubility of the catalyst portion of the molecule. The chemistry of the attachment and isolation of these groups through heteroatom functionality is well documented in the literature. In order to monitor the efficacy of the hydrophobic group to maintain the catalyst at or near the surface, we will utilize a Langmuir-Blodgett (LB) trough.

Computational approaches can assist in defining tether attachment location(s) that do not perturb the catalytic behavior of the complex, if necessary. By using a hydrophilic section in between the catalyst and the buoy (or attachment point), the original catalyst will remain virtually unperturbed and thus allow for maximal activity.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

The invention claimed is:

1. An apparatus for removing carbon dioxide from a liquid, comprising:
a catalyst portion for removing the carbon dioxide from a liquid, and
a float portion attached to said catalyst portion wherein said float portion attached to said catalyst portion is a hydrophobic tether and wherein said hydrophobic tether attached to said catalyst portion is a linear aliphatic chain, ranging in length from $C_{10}$ to $C_{18}$ and wherein said float portion positions said catalyst portion in a target containing the highest concentration of carbon dioxide.

2. An apparatus for removing carbon dioxide from a fluid of, comprising:

a catalyst portion for removing the carbon dioxide from a fluid wherein said catalyst portion is an aza-macrocyclic complex, and a float portion attached to said catalyst portion wherein said float portion positions said catalyst portion in a target liquid layer containing the highest concentration of carbon dioxide.

3. The apparatus for removing carbon dioxide from a fluid of claim 2 wherein said aza-macrocyclic complex is selected from the group consisting of cyclen, cyclam, cyclen-cyclam hybrid, C-methylamino cyclen and 1,4,7-Triaza cyclododecane.

4. A method of removing carbon dioxide from a fluid, comprising the steps of:

determining the layer containing the highest concentration of carbon dioxide, selecting a carbon dioxide removing catalyst for a catalyst portion, and attaching a hydrophobic tether to said catalyst portion wherein said hydrophobic tether positions said catalyst portion in a said layer containing the highest concentration of carbon dioxide wherein said hydrophobic tether is a linear aliphatic chain, ranging in length from $C_{10}$ to $C_{18}$.

5. A method of removing carbon dioxide from a fluid, comprising the steps of:

determining the layer containing the highest concentration of carbon dioxide, selecting a carbon dioxide removing catalyst for a catalyst portion wherein said catalyst portion is an aza-macrocyclic complex, and attaching a hydrophobic tether to said catalyst portion wherein said hydrophobic tether positions said catalyst portion in a said layer containing the highest concentration of carbon dioxide.

6. The method of removing carbon dioxide from a fluid of claim 5 wherein said aza-macrocyclic complex is selected from the group consisting of cyclen, cyclam, cyclen-cyclam hybrid, C-methylamino cyclen and 1,4,7-Triaza cyclododecane.

\* \* \* \* \*